United States Patent Office 2,845,936
Patented Aug. 5, 1958

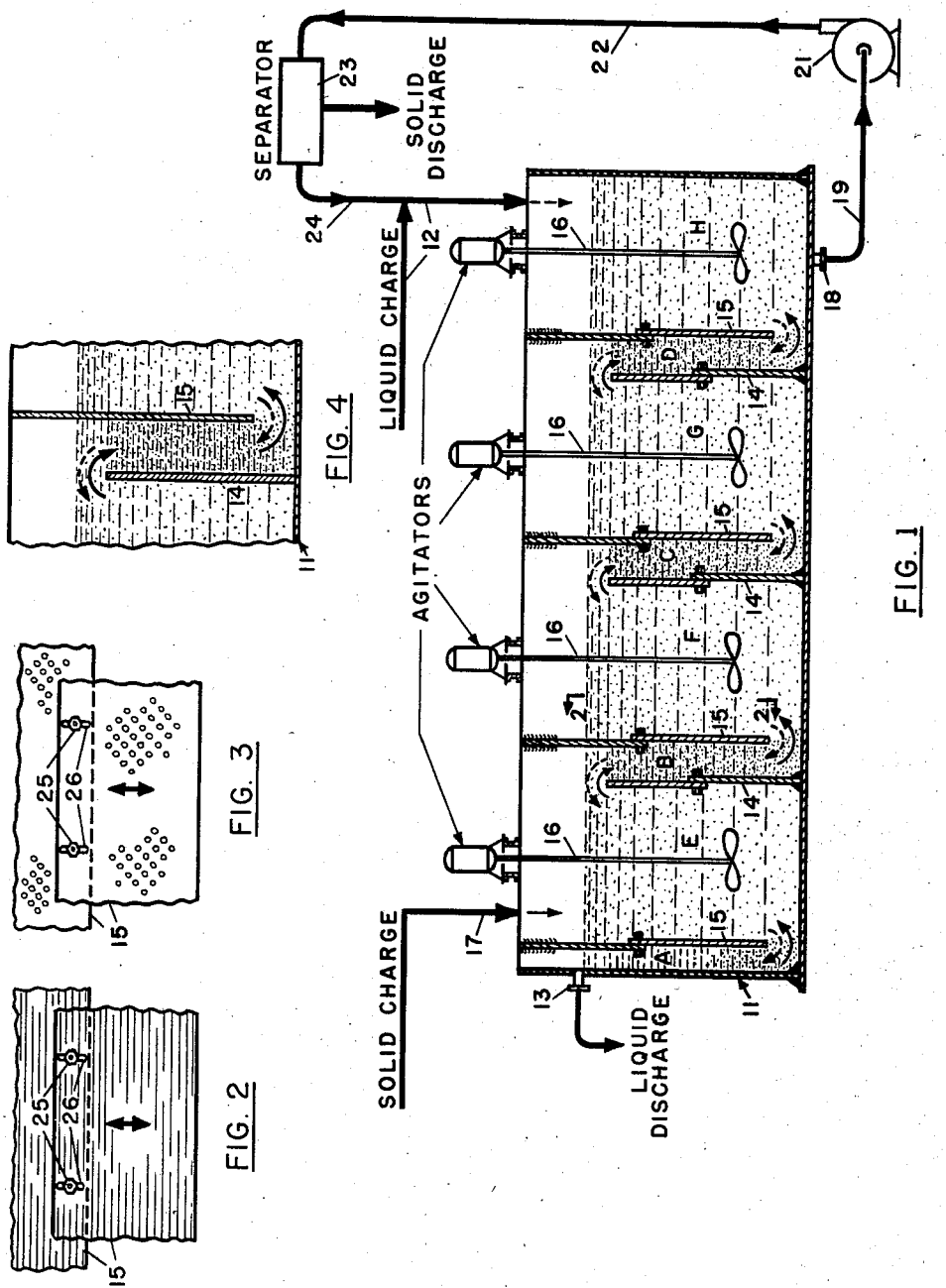
Aug. 5, 1958     D. E. BOYNTON ET AL     2,845,936
COUNTERCURRENT CONTACTING APPARATUS
Filed May 9, 1955
DONALD E. BOYNTON
STEFFEN F. DIECKMANN
INVENTORS
BY Ernest G. Peterson
AGENT.

2,845,936

COUNTERCURRENT CONTACTING APPARATUS

Donald E. Boynton and Steffen F. Dieckmann, Wilmington, Del., assignors to Hercules Powder Company, Wilmington, Del., a corporation of Delaware Application May 9, 1955, Serial No. 506,874

5 Claims. (Cl. 134—60)

This invention relates to improved apparatus for continuous countercurrent contacting and treating of particulate solids with liquids.

Although numerous mechanical devices for stagewise countercurrent contacting and treating of particulate solids with liquids have been proposed and are in use, such prior art devices have generally been recognized as having various limitations. To begin with, most of such devices are mechanically complicated and expensive to build, particularly in large sizes; generally there is a definite practical limit to the number of stages which can be incorporated in such devices. Some devices are incapable of effectively handling solid feeds containing fine particles because such fine particles, being slow-settling become entrained in the treating liquid, leave the machine with the liquid effluent, and, therefore, are not effectively extracted. In other devices where the solid is not submerged in the liquid, uniformly effective contact of the treating liquid with all of the solids is uncertain.

Accordingly, it is the principal object of this invention to provide an improved apparatus having great diversity for removing the limitations heretofore existent in prior art devices of this character. Among the objectives accomplished in accordance with this invention are the following: Provision of an apparatus which is mechanically simple; provision of an apparatus which is economical to build even in large sizes; provision of an apparatus wherein the number of treating stages is not limited; provision of an apparatus capable of effectively contacting and treating solids containing fine, slow-settling particles; and provision of an apparatus which is positive in its action in contacting and treating all of the solid-particles effectively with the liquid. Other objects of the invention will appear hereinafter, the novel features and combinations being set forth in the appended claims.

Generally described, the present invention comprises in combination a horizontally elongated vessel having charge means at one end thereof for introducing fresh liquid into said vessel and discharge means at the opposite end thereof for withdrawing spent liquid, said vessel being adapted to maintain a substantially constant level of liquid from end to end thereof, a first series of baffles and a second series of baffles in alternate parallel-spaced relationship separating the interior of the vessel into alternate quiet zones and turbulent zones from end to end thereof, each of said first baffles being in contact with the bottom and both sides of the vessel and extending vertically upward and terminating below the level of liquid maintained in the vessel, each of said second baffles being in contact with both sides of the vessel and extending vertically downward from above the level of liquid maintained in the vessel and terminating short of the bottom of the vessel to provide communication between the said quiet zones and the said turbulent zones, agitating means disposed within each turbulent zone for creating turbulence in the liquid in said zone, an inlet adjacent said discharge means for introducing particulate solids to the vessel, and an outlet adjacent said charge means for withdrawing contacted and treated particulate solids.

A preferred embodiment of the invention has been chosen for purposes of illustration and description and is shown diagrammatically in the accompanying drawings forming a part of the specification wherein reference symbols refer to like parts wherever they occur, and wherein valves, gages, and other auxiliary equipment have been omitted for the sake of simplicity.

Fig. 1 is a side elevation view in section of one embodiment of the improved apparatus in accordance with this invention;

Fig. 2 is a fragmentary front elevation view taken along section 2—2 of Fig. 1 illustrating one embodiment of baffle structure in accordance with this invention;

Fig. 3 is a fragmentary front elevation view, similar to Fig. 2, illustrating another embodiment of baffle structure in accordance with this invention;

Fig. 4 is a fragmentary side elevation view in section illustrating another embodiment of baffle structure in accordance with this invention.

With reference to Fig. 1 there is provided a horizontally elongated vessel 11 having charge means 12 at one end thereof for introducing fresh liquid into vessel 11 and discharge means 13 at the opposite end thereof for withdrawing spent liquid. Vessel 11 is adapted to maintain a substantially constant level of liquid from end to end thereof. Vessel 11 is provided with a first series of baffles 14 and a second series of baffles 15 in alternate parallel-spaced relationship separating the interior of vessel 11 into alternate quiet zones, A, B, C, D, and turbulent zones E, F, G, and H from end to end thereof. Each of the first baffles 14 is in contact with the bottom and both sides of vessel 11 and extends vertically upward and terminates below the level of liquid maintained in vessel 11. Each of the second baffles 15 is in contact with both sides of vessel 11 and extends vertically downward from above the level of liquid maintained in vessel 11 and terminates short of the bottom of vessel 11 to provide communication between quiet zones A, B, C, D, and turbulent zones E, F, G, and H.

Each of the turbulent zones E, F, G, and H is provided with agitating means 16 disposed therein to create turbulence in the liquid therein.

Vessel 11 is also provided with an inlet 17 adjacent to discharge means 13 for introducing particulate solids to vessel 11 and an outlet 18 adjacent charge means 12 for withdrawing contacted and treated particulate solids.

Contacted and treated particulate solids suspended in treating liquid, upon being discharged from vessel 11 through outlet 18, are conducted through line 19, pump 21, and line 22 to separator 23 where treating liquid is separated from the contacted and treated particulate solids. Recovered treating liquid is recycled through line 24 and charge means 12 to vessel 11.

In accordance with one embodiment of the invention, either baffles 14 or 15 or both are adapted to be raised or lowered in a vertical plane, as desired. Fig. 2 illustrates one structure for accomplishing such raising or lowering, wherein the baffle is constructed in two parts joined together by a nut and bolt assembly 25 with one or both parts of the baffle being provided with vertical slots 26 for adjustment vertically. It is preferred that baffles 14 and 15 be imperforate, as illustrated in Fig. 2. However, in accordance with another embodiment of the invention, either baffles 14 or 15 or both can be foraminous, as illustrated by Fig. 3.

According to a preferred method of operation, fresh treating liquid from charge means 12 is introduced into zone H of the vessel and the treating liquid moves progressively by gravity through zones D, G, C, F, B, E, and A in turn as illustrated in Fig. 1 by broken arrows, and spent treating liquid overflows from the vessel through discharge means 13. With the vessel full of liquid at a level governed largely by the location of the spent liquid discharge means, and with the agitators creating turbulence in each of turbulent zones E, F, G, and H, particulate solids are introduced through inlet 17 into turbulent zone E where the particulate solids become thoroughly dispersed as a slurry in the treating liquid. Due to movement caused by the turbulence, part of the slurry moves into quiet zone B, where in the absence of turbulence the solids settle out to form a settled bed. Solids at the bottom of the settled bed in quiet zone B are then continuously entrained in the turbulent treating liquid in turbulent zone F. By this alternate settling and re-entrainment process, solids then pass progressively through zones C, G, and D into H, from which the slurry of particulate solids in treating liquid is pumped to a filter or centrifuge from which solids are recovered, and the separated liquid is recycled to zone H of the vessel. Solid arrows in Fig. 1 illustrate the movement of particulate solids through the vessel from zone E to zone H.

Solids suspended in spent treating liquid which enter quiet zone A necessarily settle out and are re-entrained in the turbulent liquid in zone E, and a screen placed over the spent liquor discharge means 13 effectively prevents very fine and slow-settling particles from being carried out of the vessel in the spent liquid discharge. Screened solids gradually accumulate and settle to the bottom of zone A, from which point they become re-entrained in the turbulent liquid in zone E. When equilibrium has been achieved, each settled bed of solids is swept away from its bottom by re-entrainment in turbulent liquid, and is replenished by solids settling on top of it. The speed at which the solid moves through the vessel can be controlled by adjusting the horizontal distances between baffles 14 and 15, the clearance for flow over baffles 14 and under baffles 15, and the degree of turbulence created in the turbulent zones. Increasing any of these factors increases the speed of solid transport through the vessel. Interstage mixing of liquid or solid is prevented because of the settled beds of solids in the quiet zones between each pair of baffles 14 and 15 which overlap for a substantial proportion of their vertical height. The solid beds also serve to some extent to filter solid fines out of the treating liquid.

The cross-section of the vessel at right angles to the direction of flow of material through the vessel preferably is rectangular in shape. However, the configuration of the cross-section may, if desired, be trapezoidal, triangular, semicircular, and the like. It is desirable, however, to employ a vessel of sufficient depth so that the liquid depth in the turbulent zones is not less than the longest horizontal dimension of any turbulent zone to insure efficient agitation. It is desirable, of course, to space the baffles so that the turbulent zones are substantially equal in size.

Although apparatus having four stages of countercurrent treatment is illustrated in Fig. 1, the invention is by no means limited in this respect, for the apparatus can be constructed to provide any number of stages of treatment, depending upon the degree of treatment necessary or desirable. Preferably the baffles separating the interior of the vessel into alternate turbulent zones and quiet zones are imperforate. If desired, however, they can be foraminous, including screen of suitable mesh size. While stationary baffles have been found to be entirely satisfactory, it is desirable to adapt the baffles so that they can be raised or lowered in a vertical plane to provide a more flexible control over such factors as the clearance for flow over baffles 14 and under baffles 15.

Any suitable and convenient agitating means for creating turbulence in the liquid can be employed, including paddle mixers, turbo-mixers, aspirating devices, and the like. Preferably the degree of turbulence created in all turbulent zones should be substantially similar.

*Example*

Employing apparatus in accordance with this invention having 5 quiet zones and 5 turbulent zones, arranged in the manner illustrated in Fig. 1, a granular nitrocellulose wet with water was effectively dehydrated with ethyl alcohol. The nitrocellulose feed contained 25% by weight of water and 0% alcohol. The treating liquid consisted of 92% ethyl alcohol, and the feed ratio was 1.2 parts by weight of 92% ethyl alcohol for one part nitrocellulose (dry weight). Residence time of the nitrocellulose in each turbulent zone was about 31.6 minutes (average) and the recovered nitrocellulose, after separation from the slurry in treating liquid contained 17% total volatile consisting of 62% ethyl alcohol. Temperatures during the runs were within the range 25° to 30° C. Spent treating liquid analyzed about 80% by weight of ethyl alcohol.

Apparatus in accordance with this invention is useful for any process involving countercurrent contacting and treating of particulate solids with liquids. For example, it can be employed to remove soluble impurities from fibrous or granular particulate solids such as various cellulose derivatives, synthetic resin polymers, and the like. It can be employed to replace one liquid by another liquid in fibrous or granular particulate products, as in the dehydration of nitrocellulose as exemplified. It can also be employed to extract desirable ingredients from a particulate solid, such as extraction of rosin and turpentine from pine wood chips, and the like.

Apparatus in accordance with this invention has the advantages of being simple and economical to construct, even in large sizes, of providing any number of stages of treatment as necessary or desirable, of providing positive action of contacting all of the particulate solids effectively with liquid, and of being capable of effectively handling particulate solid feeds containing fine, slow-settling particles.

What we claim and desire to protect by Letters Patent is:

1. An apparatus for continuous countercurrent contacting and treating of particulate solids with liquids comprising in combination a horizontally elongated vessel having charge means at one end thereof for introducing fresh liquid into said vessel and discharge means at the opposite end thereof for withdrawing spent liquid, said vessel being adapted to maintain a substantially constant level of liquid from end to end thereof by liquid transfer within said vessel from liquid charge to liquid discharge by gravity flow, a first series of stationary baffles and a second series of stationary baffles in alternate parallel-spaced relationship separating the whole interior of the vessel below the level of liquid maintained in said vessel into alternate quiet zones and turbulent zones from end to end thereof, each of said first baffles being in contact with the bottom and both sides of the vessel and extending vertically upward and terminating below the level of liquid maintained in the vessel, each of said second baffles being in contact with both sides of the vessel and extending vertically downward from above the level of liquid maintained in the vessel and terminating short of the bottom of the vessel to provide communication between the said quiet zones and the said turbulent zones, continuously driven agitators disposed within each turbulent zone for creating turbulence in the liquid in said zone and for maintaining entrained solids therein in a state of turbulent suspension in said liquid, an inlet adjacent said discharge means for introducing particulate solids to the vessel, and an outlet adjacent said charge means for withdrawing contacted and treated particulate solids the initial baffle with reference to each end of the vessel being a second series baffle.

2. An apparatus in accordance with claim 1 wherein the baffles are imperforate.

3. An apparatus in accordance with claim 1 wherein the baffles are foraminous.

4. An apparatus in accordance with claim 1 wherein at least one of the two series of stationary baffles is adapted for elevation adjustment in a vertical plane.

5. An apparatus for continuous countercurrent contacting and treating of particulate solids with liquids comprising in combination a horizontally elongated vessel having charge means at one end thereof for introducing fresh liquid into said vessel and discharge means at the opposite end thereof for withdrawing spent liquid, said vessel being adapted to maintain a substantially constant level of liquid from end to end thereof by liquid transfer within said vessel from liquid charge to liquid discharge by gravity flow, a first series of stationary baffles and a second series of stationary baffles in alternate parallel-spaced relationship separating the whole interior of the vessel below the level of liquid maintained in said vessel into alternate quiet zones and turbulent zones from end to end thereof, each of said first baffles being in contact with the bottom and both sides of the vessel and extending vertically upward and terminating below the level of liquid maintained in the vessel, each of said second baffles being in contact with both sides of the vessel and extending vertically downward from above the level of liquid maintained in the vessel and terminating short of the bottom of the vessel to provide communication between the said quiet zones and the said turbulent zones, continuously driven agitators disposed within each turbulent zone for creating turbulence in the liquid in said zone and for maintaining entrained solids therein in a state of turbulent suspension in said liquid, an inlet adjacent said discharge means for introducing particulate solids to the vessel, an outlet adjacent said charge means for withdrawing contacted and treated particulate solids, a separator communicating with the outlet for separating treating liquid from contacted and treated particulate solids, and recycle means for returning separated treating liquid to the vessel the initial baffle with reference to each end of the vessel being a second series baffle.

References Cited in the file of this patent

UNITED STATES PATENTS

| | | |
|---|---|---|
| 160,743 | Barker | Mar. 16, 1875 |
| 1,683,782 | Johnson | Sept. 11, 1928 |
| 2,155,854 | Barnes | Apr. 25, 1939 |
| 2,422,656 | Carter | June 24, 1947 |
| 2,632,720 | Perry | Mar. 24, 1953 |
| 2,638,424 | Hansgirg | May 12, 1953 |
| 2,765,913 | Weiss | Oct. 9, 1956 |